Dec. 6, 1960     I. B. DYATT     2,962,907
ROTARY INTERMITTENT MOVEMENT
Filed Oct. 1, 1956     4 Sheets-Sheet 1

INVENTOR.
IRVING B. DYATT
BY
ATTORNEY.

Dec. 6, 1960             I. B. DYATT             2,962,907

ROTARY INTERMITTENT MOVEMENT

Filed Oct. 1, 1956                                     4 Sheets-Sheet 3

INVENTOR.
IRVING B. DYATT
BY
ATTORNEY.

Dec. 6, 1960      I. B. DYATT      2,962,907
ROTARY INTERMITTENT MOVEMENT
Filed Oct. 1, 1956      4 Sheets-Sheet 4

INVENTOR.
IRVING B. DYATT
BY
ATTORNEY.

United States Patent Office 2,962,907
Patented Dec. 6, 1960

2,962,907

ROTARY INTERMITTENT MOVEMENT

Irving B. Dyatt, Hollywood, Calif., assignor to Kenneth D. Clardy, Hollywood, Calif.

Filed Oct. 1, 1956, Ser. No. 613,312

23 Claims. (Cl. 74—84)

This invention relates to mechanism for converting one form of mechanical movement to another, and particularly to a so-called intermittent mechanism for converting continuous rotary movement to intermittent rotary movement.

Numerous applications exist for intermittent mechanisms of the present type of which only a few will be mentioned. It should be understood, therefore, that those applications which are discussed are intended to be illustrative, rather than limiting, in nature and that the present mechanism is susceptible of board application.

An illustrative application of the present mechanism is concerned with the intermittent feeding of motion picture film either in a projector or a camera. As is well known, motion picture film is commonly intermittently advanced through camera and projector apparatus by means of a claw-type intermittent film movement.

Existing claw-type intermittent film movements are deficient for several reasons. Thus, because the claw engages the film directly, the latter is often torn, owing to the concentrated points of application of the forces exerted on the film by the claw. Moreover, in many such film movements the claw produces a sawing action on the film resulting in gradual enlargement of its perforations and misalignment of the frames of the film with the optical axis of the camera or projector.

An equally serious disadvantage of direct engagement of the claw with the film is that the claw must travel through a distance equal to the frame height of the film being fed. In 16 millimeter film, for example, the frame height is .300 inch and in 35 millimeter film is .750 inch. The maximum rate of claw movement or oscillation, and therefore the maximum frame rate attainable are, of course, dependent on and limited by the extent of claw travel. That is, the greater the arc through which the claw oscillates the smaller will be the maximum frame rate attainable. The relatively large degree of claw oscillation in existing mechanisms, owing to direct engagement of the claw with the film, severely restricts the maximum frame rate.

A primary object of this invention is the provision of an intermittent mechanism of the oscillatory claw-type wherein intermittently driven means embodied in the mechanism itself are operatively interposed between the oscillatory claw and final means driven by the mechanism so that direct engagement of the claw with the final driven means is avoided, the arc of claw oscillation necessary to given angular or linear movement of the final driven means is appreciably reduced, and the maximum cyclic rate of the mechanism is increased.

A related object of the invention is the provision of an intermittent mechanism of the character described which is uniquely adapted to the high speed, intermittent feeding of material in strip form such as motion picture film.

As will be hereinafter discussed, however, the instant mechanism is also uniquely adapted to intermittent feeding of film, especially interrupted or pulsed intermittent feeding of film, by direct engagement of the "claw" of the mechanism with the film.

Another primary deficiency of existing claw-type intermittent mechanisms, especially as applied to intermittent film movements results from the fact that each operating cycle of the mechanisms involves at least one revolution of the driving or input shaft. That is, in the existing claw-type intermittent film movements, for example, a complete 360° revolution of the driving shaft is necessary to accomplish each intermittent advance of the film the distance of one frame.

There exists in effect, therefore, a 1:1 ratio between the speed of the driving shaft and frame rate. Thus, a frame rate of 24 frames per second requires a driving shaft speed of 1440 r.p.m. in the existing movements.

It will be readily apparent, therefore, that such existing mechanisms are completely unsuitable for high speed film movements since driving shaft speed necessary to achieve relatively high frame rates would be excessive and difficult, if not impossible, to attain.

Moreover, the relatively high driving shaft speeds of these existing claw-type film movements, even when operating at a normal 24-frame-per-second rate in a projector, for instance, necessitate the use of relatively high ratio, and therefore space consuming speed reduction units between the driving shaft and the take-up and hold back sprockets of the projector. This speed reduction is obviously necessary to match the rotary speeds of these sprockets which are driven from the input shaft to the 24-frames-per-second rate of the film.

Another primary object of the invention is, therefore, the provision of an intermittent mechanism of the character described wherein the ratio of the number of intermittent advances of the final driven element of the mechanism to the number of revolutions of the driving or input shaft may be varied over a wide range.

An allied object is the provision of an intermittent film movement wherein a plurality of intermittent advances may be imparted to the film during each revolution of the driving shaft so as to enable an appreciable reduction in the driving shaft speed necessary to a given frame rate.

In projector applications of the present film movement, for example, the driving shaft speed may be matched to the frame rate. The reduction gearing required in existing projectors between the take-up and hold back sprockets and the driving shaft may, therefore, be omitted and the sprockets directly driven from the driving shaft. The cost, complexity and size of a projector embodying the present movement are, therefore, appreciably reduced.

In many high speed camera applications, it is desirable or essential that the entire length of film in the camera not be exposed at one time, but rather that the camera be capable of interrupted or pulsed operation, under the control of an operator such as the pilot of an aircraft, to permit the high speed photographing of different objects over extended periods of time.

Various high speed, intermittent film movements, of course, have been devised which enable the taking of high speed motion pictures. These movements, however, are unsatisfactory for or incapable of interrupted or pulsed, high speed operation. This is due to the fact the inertia of the parts of these movements which are brought to rest when operation of the camera is terminated and which must, therefore, be accelerated from rest to the proper operating speed during subsequent operation of the camera to obtain a predetermined film speed, is excessive.

In printing of motion pictures, interrupted or pulsed operation of the film movement is also highly desirable and advantageous to achieve certain special effects, such as a so-called "hold-effect." In producing such an effect, the developed film being printed is fed at the normal rate to print certain frames and is then stopped for printing on successive frames of the raw film a single frame of the developed film. When the latter frames of the developed film are projected, therefore, a "still" picture results. Slowing down of the action on the developed film, for various well known reasons, may also be accomplished in a similar manner by intermittent pulsed operation of the film movement.

Yet another object of the invention is, accordingly, the provision of an intermittent mechanism of the character described which is capable of interrupted or pulsed operation and wherein the inertia of the parts of the mechanism which must be accelerated from rest to given operating speed when operation of the mechanism is commenced and subsequently decelerated from operating speed to rest when operation of the mechanism is terminated, is substantially reduced. An ancillary object is, therefore, the provision of an intermittent mechanism which is ideally suited to embodiment in pulsed, and especially high speed, pulsed film movements. As will be presently discussed, and as was preliminarily noted, in the case of film movements, the "claw" of the mechanism may engage the film directly or operate on an intermediate element.

In both the motion picture and television fields, it is highly desirable for a number of reasons well understood in the art that the intermittent film movement produce intermittent feeding of the film characterized in that the transit periods during which the film is moved are of short duration as compared to the duration of the dwell periods during which the film is stationary.

An important advantage of fast pull-down, in the television transmission of motion pictures, for example, is that the intermittent movement of the film need not be locked in with the scanning rate of the television system, as is presently necessary to avoid the so-called "shutter bar" effect.

In the past, such short duration pull-down has been impossible to achieve, owing primarily to the fact that the existing intermittent film movements are incapable of sufficiently high speed operation or cause shearing of the film perforations owing to the substantially increased loads imposed on the film.

An existing technique of locking-in of the projection and scanning systems, hereinafter referred to as a "skip-frame" technique, involves the periodic scanning of frames of the projected film twice in succession. This skip frame technique may also be applied in background projection systems and in optical printers for printing film exposed at rate on film fed at a different rate, as will be more fully discussed in the ensuing description.

A further object of the invention is, accordingly, the provision of an intermittent mechanism of the character described which is capable of providing an extremely rapid rate of movement of the final driven means during the intermittent advances of the latter, as well as accomplishing periodically interrupted, intermittent advancing means of the final driven means. An object of the invention closely related to the foregoing object is the provision of an intermittent film movement which is ideally suited to the intermittent feeding of motion picture film within an extremely short pull-down period and which is capable of accomplishing the abovementioned "skip-frame" synchronizing technique.

As preliminarily noted, the present intermittent mechanism is capable of numerous applications other than the intermittent feeding of motion picture film. Thus, again in the photographic field, the present mechanism may serve to intermittently operate the shutter in a camera or projector in synchronism with intermittent feeding of the film being exposed or printed. In many testing, research, and manufacturing facilities, it is desirable or essential that several electrical systems be sampled, that is, that various electrical quantities in such systems be measured at periodic intervals. Various types of high speed switching or read out devices for this purpose have been devised. These devices, however, are relatively complex and costly to manufacture. The present intermittent mechanism is uniquely adapted to embodiment in a simple and inexpensive high speed switching or read out device. Other allied uses of the mechanism are the conversion of analogue information to digital information, counting, shaft position digitizing, timing, automation, in general, as well as numerous other similar uses.

Another field of application of the instant invention, closely related to that just mentioned, involves the programming and operation of computers, and the performance of computing operations such as integrating operations. Thus, for example, the mechanism of this invention may comprise one or more driven shafts which are intermittently rotated at the same or different speeds and serve to drive one or more electrical means, such as potentiometers, for feeding digital electrical information into or initially balancing of the computing circuits of a computer. The mechanism may also serve to supply incremental shaft position information, or incremental time information. In other similar applications, the mechanism may serve as a computing element by providing a means of establishing a number of small, equal increments of a given quantity for integrating operations.

Yet a further object of the invention, therefore, is the provision of an intermittent mechanism of the character described which is uniquely adapted to digitizing, computer programming and operation, high speed switching, read out and numerous other uses in the fields of control, timing, instrumentation, automation and computing.

Other objects of the invention reside in the provision of an intermittent mechanism of the character described which is relatively simple and sturdy in construction, so as to be capable of prolonged operation, inexpensive to manufacture, compact in size, light in weight, and otherwise ideally suited to its many diverse applications.

Briefly, the primary illustrative embodiment of the invention, which is designed particularly for use in high speed, pulsed, motion picture cameras, comprises a hollow case journalling an internal ring gear. Meshed with this ring gear is a pinion fixed on a driven shaft journalled in and extending exteriorly of the case. Intermittent rotation is imparted to the ring gear to produce intermittent rotation of the driven shaft by operation of a so-called claw mechanism engageable directly with the ring gear. This mechanism embodies a slide which is guided for reciprocation in an oscillatory frame to move set teeth on the slide into and out of meshing engagement with the ring gear. This slide also oscillates with the oscillatory frame.

The frame is oscillated about the axis of the ring gear by a rotary eccentric working in a slot in the frame and driven from a rotary driving shaft through appropriate gearing. Cooperating cam means are provided on this driving shaft and slide to cause reciprocation of the slide during rotation of the driving shaft.

These cooperating cam means are so arranged as to cause reciprocation of the slide to engage and disengage the teeth thereon with the ring gear during dwell of the oscillatory frame at the limits of its arc of oscillation. A slight amount of clearance is provided between the rotary eccentric and the walls of the slot in which the eccentric works to increase the dwell of the frame at these limits. Engagement and disengagement of the teeth on the slide with the ring gear by pure, linear radial movement of the slide is thereby accomplished. Rubbing or sawing of the slide teeth on the teeth of the ring gear is thus minimized and wearing of the mechanism is appreciably reduced.

Briefly, in operation of the device, the slide is advanced to engage the ring gear during dwell of the frame at one limit of its arc of oscillation whereupon the frame is rocked to the other limit of this arc to impart rotational movement to the ring gear through an angle determined by the arc of oscillation of the frame. During dwell of the frame at the latter limit of oscillation, the slide is retracted out of engagement with the ring gear whereupon the frame is rocked in the opposite direction to the initial limit of its arc oscillation and the cycle is repeated. The ring gear is thus rotated in an intermittent fashion.

The number of oscillations of the frame for each intermittent advance of the ring gear may be varied by varying the gear ratio between the rotary eccentric and the driving shaft and/or varying the number of reciprocations of the slide during each revolution of the driving shaft by suitably designing the cam means on these parts.

The invention has numerous other novel features of construction, operation and use, as may be best understood from the following detailed description taken in connection with the accompanying drawings, wherein.

Referring now to these drawings, and particularly to Figures 1 through 4A thereof, the illustrative embodiment of the present intermittent mechanism comprises a case 20 including cover and back portions 22 and 24, respectively. These case portions are secured together in any suitable manner such as by screws 26.

Cover 22 of the case has a circular recess 28 in its inner face. Rising from the bottom wall of this recess 28 is an upstanding boss 30 which is located in a radial plane, designated as P1 (Figure 1) passing through the center of the circular recess 28. Cover 22 is also formed with an axial bore 32 opening into the circular recess 28. Indicated at 34 are a pair of upstanding bearing posts integral with the end wall of recess 28 and located at diametrically opposite sides of bore 32 and in a plane, designated as P2 (Figure 1) passing through the center of the circular recess 28 at right angles to the plane P1.

Back 24 of case 20 also has formed in its inner face a circular recess 36 which is somewhat shallower than the recess 28 in cover 22. The rim, defined by the circular recess 36, is internally grooved to provide an annular seat 38 for reasons to be discussed. Rising from bottom wall of circular recess 36 and concentric therewith are a pair of upstanding cylindric bearings 40 of approximately 90 degrees angular extent. As shown most clearly in Figure 1, these cylindric bearings occupy diametrically opposed positions in the circular recess 36 and are symmetrically located relative to the plane P2 so that the opposing ends of the bearings are spaced approximately 45 degrees to opposite sides of the plane P1. As will be observed most clearly in Figure 3, the inner ends of the cylindric bearings 40 are coplanar with the inner face of the back 24. Opening to the bottom wall of the recess 36 in back 24 and concentric with the recess 36 is a bore 42 somewhat larger in diameter than the bore 32 in cover 22.

Enclosed within the case 20, just described, are the working parts of the present intermittent mechanism including a rotary driving shaft 44 and a rotary driven shaft 46. Rotary driving shaft 44 includes a reduced end portion which is journalled in the inner race of a ball bearing 48, the outer race of which is press-fitted in the bore 32 of cover 22. This reduced end portion of the driving shaft projects externally of the case 20 for connection to a rotary driving means, not shown.

Figure 4:
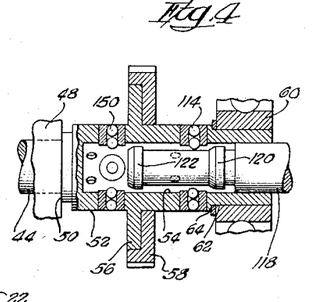
Figure 4 is an enlarged section taken along line 4—4 of Figure 3 illustrating the pulsing actuator embodied in the mechanism, in retracted, inoperative position.

As shown most clearly in Figure 4, the driving shaft 44 is radially enlarged within the casing 20 to provide an annular shoulder 50 which bears on the inner race of the ball bearing 48 to support the driving shaft in one axial direction. The intermediate portion of the driving shaft 44 is further radially enlarged at 52 and formed with an axial bore 54 opening through the other end of the driving shaft, as shown. The central portion 52 of the driving shaft thus has a generally cylindrical shell construction and is intermediately formed with an enlarged radial flange 56 over which, and the central portion 52 of the driving shaft, is press-fitted an annular, axially flanged gear 58. This gear 58 is preferably constructed of nylon but may be made of any suitable material.

Beyond the enlarged central portion 52, the driving shaft 44 is somewhat reduced in diameter and is journalled in the inner race of a ball bearing 60, the outer race of which is press-fitted in the bore 42 of the back 24. An annular bearing washer 62 is positioned about this reduced portion of the driving shaft 44, between the annular shoulder 64 at the junction of the reduced portion of shaft 44 and its central enlarged portion 52, and the inner race of ball bearing 60 to support the driving shaft in the other axial direction. Driving shaft 44 is thus supported in opposite axial directions between the inner races of the two ball bearings 48 and 60.

Driving gear 58, on the driving shaft 44, meshes with a pinion 66 (Figures 1 and 2) fixed on a shaft 68. One end of shaft 68 is journalled in a ball bearing 70, press-fitted in a bore 72 formed in the inner face of boss 30 in the cover 22. The opposite end of shaft 68 is journalled in a ball bearing 74, press-fitted in a recess 76 in the end wall of back 24 of the case 20.

Shaft 68 is centrally formed with a pair of spaced, aligned eccentrics 78 which are rotated by the driving shaft through the gears 58, 66.

Journalled in the upstanding cylindric bearings 40 on the back 24 is an oscillatory frame 80. As shown most clearly in Figure 1, and Figures 5 through 8, this oscillatory frame comprises a cylindric, ring portion 82 which is journalled in the upstanding, cylindric bearings 40 for rocking of the frame about the axis of the driving shaft 44. Shaft 44 extends through the frame 80, as shown. Extending outwardly from this oscillatory frame at opposite sides of and equally spaced from a radial plane passing through the center of oscillation of the frame, are a pair of parallel extensions 84 provided with nylon bearing inserts 86. These bearing inserts define therebetween a pair of slots in which the rotary eccentrics 78 work, the eccentrics engaging the inserts to oscillate the frame 80 when the shaft 68 is rotated. For reasons to be hereinafter discussed, the spacing d1, Figure 5, between the opposing faces of the bearing inserts 86, is slightly greater than the diameter of the rotary eccentrics 78 so that slight clearance exists between the rotary eccentrics and the bearing inserts. This clearance has been exaggerated in Figure 5, as well as Figures 6 through 8, for the sake of clarity.

Extending radially outwardly from the ring 82 of the oscillatory frame 80, in diametrically opposed relationship to the extensions 84, is a centrally bored boss 88. Slidably guided in this boss for radial reciprocation is a pin 90 which is fixed at its inner end to a second, cylindric, ring-shaped frame or slide 92. Slide 92 receives the enlarged central portion 52 of the driving shaft 44 therein. As shown most clearly in Figures 5 through 8, the opening in the slide 92 is somewhat larger than the external diameter of the enlarged driving shaft portion 52 so that clearance exists between this shaft portion and the slide.

Slide 92 is provided with a radial extension 94 coaxial with and diametrically opposite the pin 90. This extension 94 is slidably guided in an opening 96 in a flat portion 98 of the oscillatory frame 80 between the extensions 84 of the latter frame. Preferably, the extension 94 and the opening 96 receiving the same are squared to restrain the slide 92 against rotational movement about its axis of reciprocation. The slide 92 thus oscillates with the frame 80 while being supported in the latter for reciprocation along this axis. Reciprocation is imparted to the slide 92, to alternately engage and disengage a pair of teeth 98 on the forward end of the pin 90 with the teeth of an internal ring gear 100, by the camming means described below.

Figure 1:
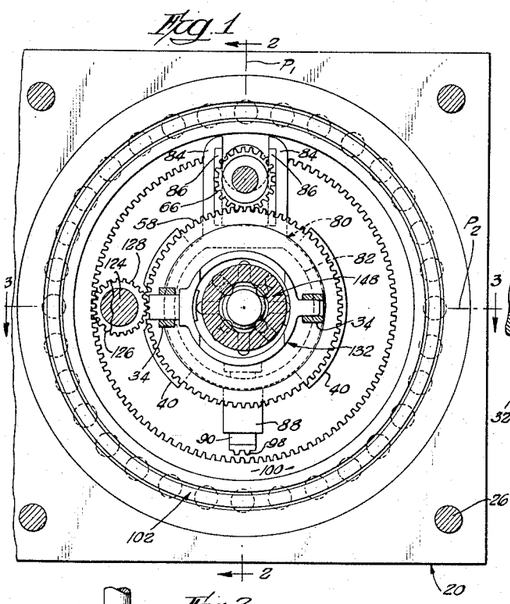
Figure 1 is a top plan view of the present intermittent mechanism, the cover of the case enclosing the mechanism being removed and parts being broken away for clarity.
Figure 2:
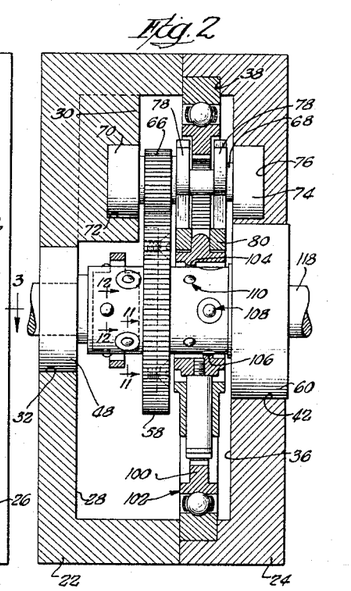
Figure 2 is a section taken along line 2—2 of Figure 1.
Figure 3:
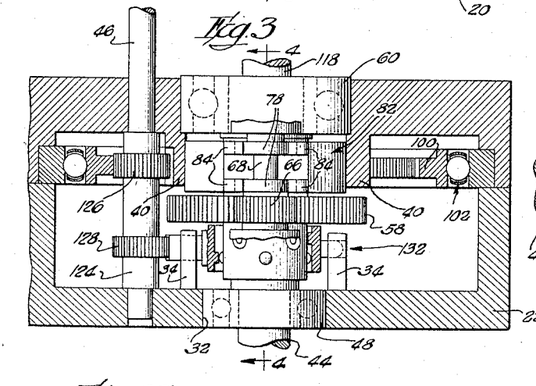
Figure 3 is a section taken along line 3—3 of Figure 1.

As shown most clearly in Figure 2, internal ring gear 100 is formed by a radial flange on the inner race of a ball bearing 102, the outer race of which seats in the annular seat 38 in the back 24 of the case 20. In the assembled condition of the case, the outer race of bearing 102 is firmly clamped between the back 24 and the cover 22 of the case. Rotary eccentrics 78 and extensions 84 on the oscillatory frame 80 straddle this internal ring gear 100, as shown.

The camming means, abovementioned, for reciprocating the slide 92 in the oscillatory frame 80, comprise a pair of radially inwardly projecting camming surfaces 104 and 106 on the internal surface of the slide 92. As shown in Figures 5 through 8, these camming surfaces are diametrically opposed and symmetrically arranged with respect to the axis of reciprocation of the slide 92. Also, as shown in Figure 2, the camming surfaces 104 and 106 are axially offset to opposite sides of this axis.

Figure 12:
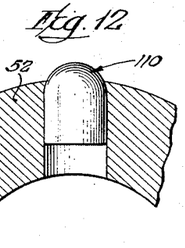
Figure 12 is an enlarged section taken along line 12—12 of Figure 2.

Cooperating with these cam surfaces 104 and 106 to reciprocate the slide 92 are sets of radially movable ball assemblies 108, located in the plane of the camming surface 106, and fixed, spherical camming projections 110 located in the plane of camming surface 104. In the illustrative embodiment of the invention, the camming projections 110 comprise hardened steel inserts (Figure 12), shown as four in number, having semi-spherical outer ends. These inserts are press-fitted in bores in the enlarged central portion 52 of the driving shaft and are equally spaced 90 degrees apart. The arrangement of these fixed cam inserts 110 and the camming surface 104 is such that engagement of any one of the inserts with the camming surface 104, during rotation of the driving shaft 44, imparts movement to the slide 92 in a direction along its axis of reciprocation to retract the teeth 98 on the frame out of engagement with the teeth of ring gear 100.

Figure 11:
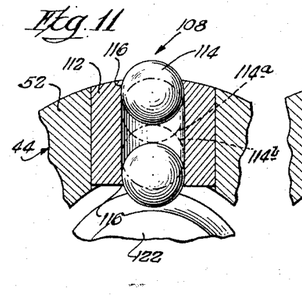
Figure 11 is an enlarged section taken along line 11—11 of Figure 2.

The movable ball assemblies 108 are also shown as being four in number and equally spaced 90 degrees apart. Also, these assemblies are offset 45 degrees from the camming inserts, as shown. Referring to Figure 11, these assemblies comprise hardened sleeves 112 which are press-fitted in radial openings in the enlarged central portion 52 of the driving shaft 44. Slidably received within each of the sleeves 112 are a pair of balls 114 which are restrained against movement from the sleeves 112 by annular lips 116 at opposite ends of the sleeves 112 about the bores therethrough. The outer one of the balls 114 in each of the assemblies is adapted for movement from its solid line position to the inner dotted position indicated at 114A wherein the surface of each outer ball is flush with the outer cylindrical surface of the enlarged portion 52 of the driving shaft. The inner ones of the balls 114 are adapted for movement from the inner solid line position to the outer dotted line position indicated at 114B.

Designated at 118 in Figure 4 is an actuator which is slidable in the bore 54 of the driving shaft 44 and projects beyond the case 20 through the open end of the bore for connection to suitable operating means, not shown. This operating means may comprise, for example, a solenoid for moving the actuator 118 from its retracted inoperative position of Figure 4 to its extended operative position of Figure 4A. Actuator 118 has an enlarged outer portion slidably guided in the bore 54 of the driving shaft and a reduced inner portion formed with a pair of radially enlarged, axially spaced annular camming shoulders 120 and 122. These camming shoulders are formed with inner inclined camming faces, as shown.

When the actuator 118 is in its retracted position, illustrated in Figure 4, the balls 114 in the ball assemblies 108 are released for movement to their inner positions wherein the outer balls are flush with the outer surface of the enlarged portion 52 of the driving shaft. When the actuator is axially moved to the extended position of Figure 4A, the balls are cammed to their outer positions by the camming shoulder 120.

In this outer or extended position of the balls, the outer balls of the assemblies project beyond the surface of shaft portion 52 for engagement with the camming surface 106 to cause movement of the slide 92 in a direction along its axis of reciprocation to move the teeth 98 on the slide 92 into engagement with the ring gear 100.

Figure 4A:
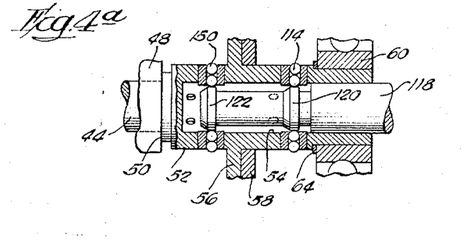
Figure 4A is a view similar to Figure 4 illustrating the actuator in extended, operative position.

The arrangement is such, as will be presently more fully discussed, that with the actuator 118 in its extended position of Figure 4A, rotation of the driving shaft 104 to rotate the rotary eccentrics 78 causes oscillation of the oscillatory frame 80 and also reciprocation of the slide 92 within the oscillatory frame by alternate engagement of the camming inserts 110 and extended balls 114 with their respective camming surfaces 104 and 106. The angular extent of the camming surfaces 104 and 106 is such that one of the balls 114 engages the camming surface 106 immediately after disengagement of a camming insert 110 from its camming surface 104. Conversely, a camming insert 110 engages its camming surface 104 immediately after disengagement of an extended ball 114 from its camming surface 106. The cycle of operation, illustrated in Figures 5 through 8, is thereby obtained.

Figures 5, 6:
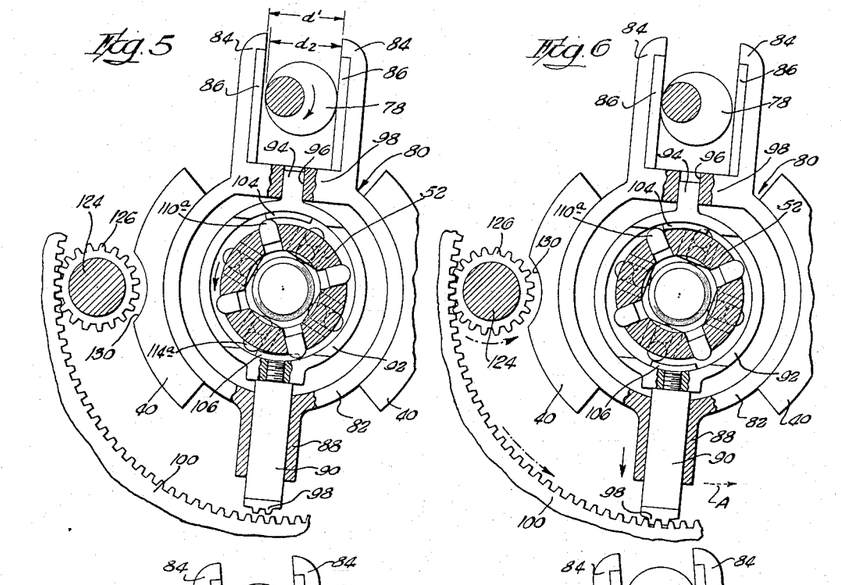
Figures 5 through 8 are enlarged partial sections illustrating the cyclic operation of the ring gear advancing assembly embodied in the present intermittent mechanism.

Thus, assuming an initial positioning of the parts as illustrated in Figure 5, wherein the teeth 98 on slide 92 are retracted out of engagement with the ring gear 100, rotation of the driving shaft 44 in the counterclockwise direction indicated, brings a first set of extended balls 114 into engagement with their camming surface 106. Slide 92 is thereby cammed in a downward direction, as viewed in these figures, to engage teeth 98 on the slide with those of ring gear 100. This condition is illustrated in Figure 6. The oscillatory frame 80 is now oscillated in a direction indicated by the dotted arrow A in Figure 6 to the position in Figure 7, to impart rotation to the ring gear 100. During dwell of the frame 80 in the position of Figure 7, a first one of the camming inserts 110 is moved into engagement with its camming surface 104 to cam slide 92 in an upward direction, as viewed in Figures 5 through 8, to retract teeth 98 out of engagement with the ring gear (Figure 8). The oscillatory frame 80 is finally oscillated back to its initial position of Figure 5, with the teeth 98 disengaged from the ring gear 100, and the cycle is repeated. Intermittent rotation is thus imparted to the ring gear 100. The operation of the mechanism, briefly described above, will be hereinafter more fully set forth.

Driven shaft 46 has an end and intermediate portion journalled in cover 22 and back 24 of the casing 20, as shown, and is radially enlarged at 124 between these journalled portions to provide a pair of oppositely facing, annular shoulders which abut the end walls of the case to support the shaft in an axial direction. Formed on this enlarged portion 124 of the driven shaft are a pair of pinions 126 and 128. Pinion 126 meshes with the ring gear 100 so that intermittent rotation of the ring gear produces intermittent rotation of the driven shaft 46. The left hand one of the cylindric bearings 40, as viewed in Figure 5, is provided with a cylindric cut-out 130 to provide clearance for the pinion 126.

Pinion 128 on the driven shaft cooperates with a registry assembly, generally indicated at 132, to lock the driven shaft and ring gear against rotation when the teeth 98 on the slide 92 are disengaged from the ring gear. This registry assembly, shown most clearly in Figures 9 and 10, comprises a slide 134 fixed to one side of which is a pin 136. Pin 136 extends radially from the slide 134 and is formed with a pair of teeth 138 at the forward end thereof adapted to be moved into and out of meshing engagement with the teeth of the pinion 128 by reciprocation of the slide 134.

Slide 134 is mounted for reciprocation in the two bearing posts 34 on the cover 22 of case 20. To this end, pin 136 of the slide 134 extends slidably through a bore in one of the bearing posts 34 and the slide 134 is provided with a squared extension 140, coaxial with and diametrically opposite the pin 136, which is slidably received in a squared opening in the other bearing post 34 to retain the slide 134 against rotational movement about its axis of reciprocation.

Slide 134 is caused to reciprocate by cam means substantially identical to the cam means previously described for reciprocating the slide 92 in the oscillatory frame 80. In the cam means for slide 134, the positions of the camming surfaces 142 and 144, which cooperate, respectively, with four equiangularly spaced fixed camming inserts 146 and four equiangularly spaced movable ball assemblies 148 including movable balls 150, carried in the enlarged portion 52 of drive shaft 44, are oppositely arranged relative to the camming surfaces 104 and 106, balls and inserts, previously described. That is, the camming surfaces 142 and fixed cam inserts 146 in the registry assembly are arranged to cause extension of the slide 134 to engage its teeth 138 with the teeth of the pinion 128. The camming surface 144 and movable balls 150, on the other hand, are arranged to cause retraction of the teeth 138 out of engagement with the pinion 128.

As will be recalled, this is just the reverse of the cam arrangement previously described with reference to the slide 92. Thus, in this latter frame the fixed camming inserts 110 cause retraction of the teeth 98 on the frame 92 out of engagement with the ring gear 100 while the balls 108 cause engagement of the teeth 98 with the ring gear 100.

The balls 150 in the registry assembly are moved to their outer or extended position, corresponding to the solid line position described with reference to balls 114 in Figure 11, by the camming shoulder 122 on the actuator 118 when the latter is moved to its extended position of Figure 4A. As will be observed in Figures 9 and 10, the camming surfaces 142 and 144 are diametrically opposed, as are the camming surfaces 104 and 106, the camming surfaces 142 and 144, however, being slightly offset with respect to the axis of reciprocation of the frame 134 for reasons to be seen. As will be discussed in the operation of the device, teeth 138 on the slide 134 are moved into and out of engagement with the teeth of the pinion 128 in alternate sequence with engagement and disengagement of the teeth 98 on the slide 92 with the teeth of the ring gear 100. The registry assembly serves to lock the driven shaft 36 and the ring gear 100 against rotation during the periods of disengagement of the teeth 98 from ring gear 100.

*Operation*

In use of the above described mechanism as an intermittent film movement, the driving shaft 44 is coupled to a suitable rotary driving means, not shown, and driven shaft 46 mounts thereon or is drivably connected to a film sprocket. Assuming, for the moment that the actuator 118 is in its extended position of Figure 4A so that the balls 114 and 150 associated, respectively, with the slide 92 and the slide 134, are in their extended positions, it will be seen that rotation of the driving shaft causes alternate engagement of the camming inserts 110 and balls 114 with their respective camming surfaces 104 and 106 and alternate engagement of the camming inserts 136 and balls 150 with their respective camming surfaces 142 and 144.

Assuming an instant during the operating cycle of the mechanism wherein the parts are positioned as shown in Figure 5, it will be observed that one of the camming inserts 110, identified as 110A in Figure 5, is engaged with the camming surface 104 on the slide frame 92. The teeth 98 on the latter frame are, therefore, disengaged from the ring gear 100. The driving shaft 44 is illustrated as being in an angular position wherein the camming insert 110A is just at the point of disengagement from the camming surface 104 and one set of the balls 114, identified in Figure 5 as 114A, are just about to engage their camming surface 106.

Accordingly, continued rotation of the driving shaft effects disengagement of the camming insert 110A from the camming surface 104 and engagement of the balls 114A with the camming surface 106 with resulting extension of slide 92 to engage its teeth 98 with the ring gear 100. The rotary eccentrics 78 are, of course, also revolved about their eccentric axis, namely, the axis of shaft 68. The rotary eccentrics 78 are so angularly oriented relative to the driving shaft 44 that at the above discussed instant of disengagement of the camming insert 110A from the camming surface 104 and engagement of the balls 114A with the camming surface 106, the eccentrics are in one maximum throw position so that the oscillatory frame 80 occupies one extreme limit in its arc of oscillation.

Accordingly, during the incremental rotation of the driving shaft 44 from the position of Figure 5 to that of Figure 6, during which the teeth 98 on the frame 92 are engaged with the ring gear 100, the rotary eccentrics 78 will be rotating in a direction to oscillate the frame 80 to the opposite limit of its arc of oscillation. Thus, during rotation of the driving shaft 44 from the position of Figure 5 to that of Figure 6, the rotary eccentrics 78 will be rotated through the small angle illustrated. Owing, however, to the slight clearance between the rotary eccentrics 78 and the left-hand bearing insert 86 on the oscillatory frame 80, resulting from the difference in the dimensions $d1$ and $d2$, the rotary eccentrics will not become engaged with the left-hand bearing insert 86, to oscillate the frame 80 in such opposite direction, until the eccentrics have turned to the position of Figure 6. During this interval the teeth 98, as just discussed, are engaged with the ring gear 100. It is apparent, therefore, that the teeth 98 are engaged with the ring gear 100 while the oscillatory frame 80 dwells at one limit of its arc of oscillation and thus move along a linear, radial path into engagement with the ring gear 100. The ring gear 100 will be initially so oriented that the teeth 98 will exactly mesh with those of the ring gear, and, therefore, rubbing and wearing of the teeth 98 and those of the ring gear is substantially eliminated.

Continued rotation of the driving shaft 44 with the teeth 98 engaged with the ring gear 100 causes oscillation of the frame 80 in the direction indicated by the dotted arrow A in Figure 6. The ring gear 100 and pinion 126 are thus rotated, in the direction indicated, to the position of Figure 7, wherein rotary eccentrics 78 have been rotated to their other maximum throw position. The length of the camming surfaces 104 and 106 is such that during rotation of the driving shaft from the position of Figure 6 to that of Figure 7, the ball 114A will have traversed substantially the entire length and will be just at the point of disengagement from the camming surface 106. The next following camming insert 110B will have been moved to the point wherein it is just ready to engage the camming surface 104. Accordingly, the next increment of rotation of the driving shaft effects disengagement of the ball 114A from the camming surface 106 and engagement of the camming insert 110B with the camming surface 104, as indicated in Figure 8, to move the slide 92 in a direction along its axis of reciprocation to disengage the teeth 98 from the ring gear 100, the position of Figure 8.

Figure 7:
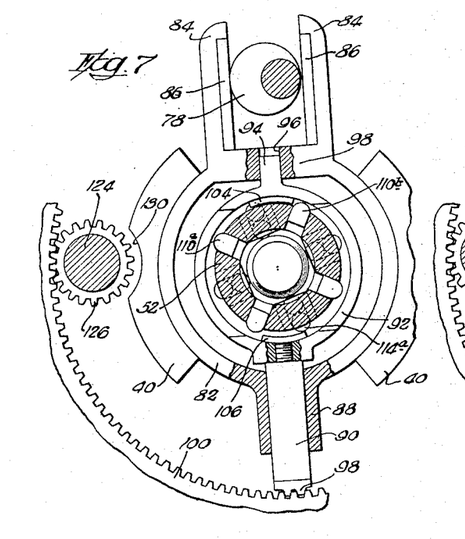
Figure 8:
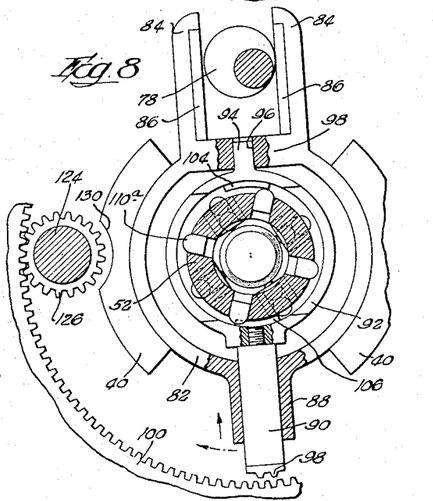

It will be observed that upon turning of the rotary eccentrics 78 to the maximum throw position of Figure 7, wherein the oscillatory frame 80 is rocked to the other extreme limit in its arc of oscillation, clearance exists between the rotary eccentrics and the right-hand bearing insert 86 on the frame 80. Accordingly, rotation of the rotary eccentrics 78 from the position of Figure 7 to the position of Figure 8, resulting from rotation of the driving shaft 44 from the position of Figure 7 to that of Figure 8, does not cause rocking of the oscillatory frame 80. Thus, the teeth 98 on the slide 92 are disengaged from the ring gear 100 while the oscillatory frame 80 is stationary at the last-mentioned limit in its arc of oscillation. Wearing and rubbing of the teeth 98 and the teeth of the ring gear 100 is thus avoided.

Continued rotation of the driving shaft 44 beyond the position of Figure 8, with the teeth 98 on the slide 92 disengaged from the ring gear 100, causes rotation of the rotary eccentrics 78 and rocking of the frame 80 to the position of Figure 5 for repetition of the cycle just described. Continuous rotation of the driving shaft 44 with the actuator 118 in its extended position of Figure 4A, therefore, causes oscillation of the frame 80 and alternate engagement and disengagement of the teeth 98 on the slide 92 with the ring gear at the opposite limits of the arc of oscillation of the frame 80. Intermittent rotation is thus imparted to the ring gear 100 and therefore to the pinion 126 and driven shaft 46.

In the illustrative embodiment of the invention, wherein four balls and four camming inserts are employed, and the gear reduction ratio between the driving gear 58 and the driven pinion 66 is four-to-one, intermittent advancing of the ring gear 100 occurs during each rocking of the frame 80 in the counterclockwise direction of the arrow A in Figure 6. Also, it will be seen that the ring gear 100 is intermittently advanced four times for each revolution of the driving shaft. The number of balls and camming inserts, and the gear ratio between the driving gear 58 and the driven pinion 66 may be varied to vary the ratios of oscillations of the frame 80 to intermittent advances of the ring gear 100 and revolutions of the driving shaft 44 to intermittent advances of the ring gear 100.

Figure 9:
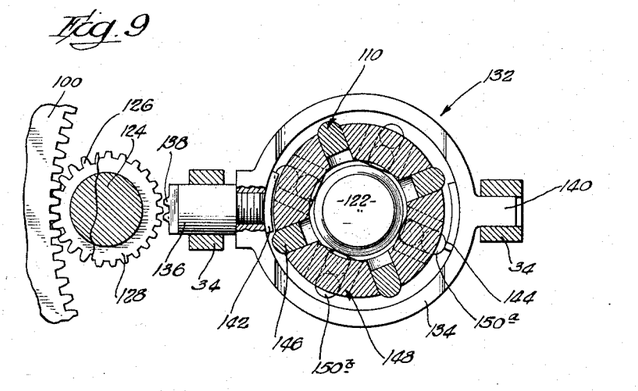
Figures 9 and 10 are enlarged partial sections illustrating the cyclic operation of the registry or ring gear locking assembly of the mechanism.
Figure 10:
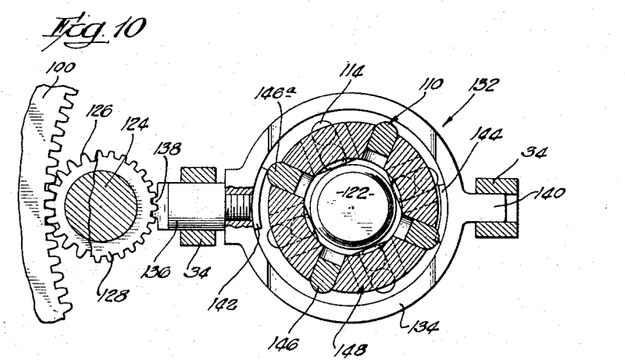

The arrangement of the camming surfaces 142, 144, camming inserts 146 and the balls 150 in the registry or ring gear locking assembly of Figures 9 and 10 is such that when the ring gear advancing mechanism, just described, is in the position of Figure 5, the ring gear locking mechanism is in the position of Figure 9. In Figure 9, one of the sets of balls 150, identified as 150A, has just engaged the camming surface 144 to retract the teeth 138 on the slide 134 out of engagement with the pinion 128. Driven shaft 46 and ring gear 100 are thus released for rotation during operation of the ring gear advancing mechanism from the position of Figure 6 to that of Figure 7. Upon rotation of the driving shaft to the position of Figure 7, one of the camming inserts 146, identified as 146A in Figure 10, will have been rotated to a position just prior to engagement with the camming surface 142.

Upon rotation of the driving shaft from the position of Figure 7 to the position of Figure 8 to retract the teeth 98 on the slide 92, out of engagement with the ring gear, therefore, the slide 134 in the ring gear locking mechanism is moved into engagement with the pinion 128 to lock the ring gear and driven shaft against rotation during operation of the ring gear advancing mechanism from the position of Figure 8 to the position of Figure 5. During this latter operation of the advancing mechanism, the next following set of balls 150 in the ring gear locking mechanism of Figure 9 will have been rotated to the position just prior to engagement with the camming surface 144, so that upon commencement of the next cycle of operation, corresponding to operation of the ring gear advancing mechanism from the position of Figure 5 to that of Figure 6, the teeth 138 on the slide 134 are disengaged from the pinion 128 to release the ring gear and driven shaft.

Thus, the ring gear is intermittently released and locked in alternate sequence with engagement of the slide 92 and ring gear and oscillation of the frame 80 to advance the ring gear. The locking mechanism of Figures 9 and 10 is provided to assure exact registry of the slide teeth 98 with the teeth of the ring gear and prevent overrunning of the ring gear under the action of the inertia of the parts of the mechanism and the means driven by the mechanism.

When the present mechanism is employed for intermittent feeding of motion picture film in a camera or projector, for example, the driven shaft 146, which is intermittently rotated as above-described, mounts thereon or is drivably connected to a film sprocket for intermittent feeding of the film by intermittent rotation of the sprocket. As preliminarily discussed, a primary advantage of the present mechanism is concerned with its ability to accomplish pulsed or interrupted high speed operation of cameras. In such cases, the actuator 118 is connected to a solenoid or other suitable actuating means, not shown, for movement between the extended position of Figure 4A, wherein the mechanism operates as above described, to the retracted position of Figure 4.

In such retracted position of the actuator, the balls 114 and 150 are released for radial inward movement. When the balls engage their respective cam surfaces 106 and 144 during rotation of the driving shaft, therefore, they are merely cammed inwardly to the solid line and dotted line positions 114B, Figure 11. Thus, with the actuator 118 retracted, slide 92 is cammed to its retracted position by operation of the camming inserts 110 but is not cammed to its extended position, to engage its teeth 98 with the ring gear 100. The slide 92, therefore, remains in retracted position. Similarly, with the actuator 118 retracted, the camming inserts 146 in the ring gear locking mechanism of Figures 9 and 10, cam the slide 144 to its extended position to engage its teeth 138 with the pinion 128 and lock the ring gear against rotation. The frame 144 is not cammed to its retracted position, owing to the unrestrained inward movement of the balls 150. Thus, with the actuator 118 retracted, the ring gear 100 remains locked and stationary.

To again effect intermittent rotation of the ring gear 100, the solenoid or other actuating means associated with the actuator is operated to move the actuator to its extended position of Figure 4 wherein intermittent rotation is again imparted to the ring gear. It will be observed, that with the actuator 118 retracted, the oscillatory frame 80, the slide 92, the rotary eccentrics 78 and the driving shaft 44 are continuously rotated. Accordingly, the only parts of the mechanism which need be accelerated up to operating speed from rest when operation of the mechanism is commenced, or decelerated from operating speed to rest when operation of the mechanism is terminated, are the ring gear 100, driven shaft 46 and pinions 126 and 128 thereon. The inertia of the parts which must be accelerated and decelerated at the commencement and termination of operation of the mechanism during pulsed operation is, therefore, kept at a minimum.

The present mechanism is thus uniquely adapted to pulsed operation of high speed motion picture cameras. It has been found, for example, that owing to the small amount of film fed during the acceleration and deceleration periods of the mechanism in pulsed operation, the initial supply of film in a camera embodying the present mechanism to assure a given footage of properly exposed film during pulsed operation, may be appreciably reduced.

As discussed, the illustrative embodiment of the invention is especially designed for intermittent feeding of motion picture film and to this end the parts are shown as being so designed that ring gear 100 is advanced a distance of four teeth during each oscillation of the frame 80 in counterclockwise direction. The ratio between the pinion 126 on the driven shaft and the ring gear 100 is such that motion picture film, engaging a sprocket, not shown, on the driven shaft is advanced a distance of one frame during each advance of the ring gear. In an actual model of the invention, constructed in accordance with the above illustrative form of the invention, the teeth 98 on the slide 92, which form, in effect, the "claw" of the mechanism, are oscillated a distance of approximately .100 inch to advance the film the distance of one frame. One frame of 35 mm film, for example, corresponds to approximately .750 inch of film travel. It will be apparent, therefore, that oscillatory movement of the "claw" is relatively slight and appreciably less than the movement imparted to the film itself. Because of this slight claw travel, the rate of oscillation of the "claw" and, therefore, the rate of intermittent film movement obtainable with the mechanism may be appreciably increased.

As previously discussed, the arrangement of the primary illustrative embodiment is such that the ring gear 100 is intermittently advanced four times for each revolution of the driving shaft 44. In intermittent film movements, this results in a 45 degree pull down; that is, the film is intermittently advanced one frame during 45 degrees of angular movement of the driving shaft. By increasing the speed reduction between the driving shaft and rotary eccentrics (by an even multiple of the number of balls or inserts) and appropriately decreasing the angular spacing between the balls and camming inserts on the driving shaft, however, this pull down may be reduced. As an example, assume a 16:1 reduction between the speed of the driving shaft and that of the eccentric shaft. As hereinbefore seen, the ring gear is advanced during one half revolution of the eccentric shaft. With an 16:1 ratio, therefore, the driving shaft turns through 1/16 of a revolution or 11¼ degrees for each advanced only during 11¼ degrees rotation of the driving shaft to obtain a 11¼ degree pull down. It will be apparent, of course, that the gear ratio between the driving and eccentric shaft must always be equal to or be an even multiple of the number of balls (or camming inserts) in order to synchronize oscillation of the slide with its reciprocation and assure extension and retraction of the slide at the limits of its arc of oscillation.

Also, if the speed reduction ratio between the driving and eccentric shafts is equal to the number of balls (or camming inserts), the latter will be equiangularly spaced about the driving shaft. As the pull down is decreased, however, without altering the number of balls or inserts (so as to retain the same frame rate), the angular spacing between each ball and the immediately following camming insert must be decreased accordingly. With a 11¼ degree pull down, for example, this latter spacing will be 11¼ degrees.

The advantage of rapid pull down has been preliminarily discussed and resides in the fact that the rate of movement of the film during intermittent advancing thereof is so fast as to be undetectable to the human eye when a developed film, for example, is projected on a viewing screen. Also, for a given frame rate, as the pull down is decreased, the dwell of the film is proportionately increased. With an 11¼ degree pull down, for example, the pull down is so rapid and the dwell, during which the film is exposed or projected, so prolonged that film may be exposed under poorer lighting conditions and, in the case of a projector, may be projected on a viewing screen with a lamp of reduced intensity and without the aid of a shutter for blanking out the projection beam during advancing of the film. The omission of the shutter, reduction in the lamp intensity necessary, and the light requirements necessary for proper exposure of film, are decided advantages which enable cameras and projectors of substantially less complex and costly construction, and of smaller size.

As preliminarily discussed, the number of intermittent advances of the ring gear and driven shaft, and, therefore, of the film for each revolution of the driving shaft may be varied by varying the number of balls and camming inserts on the driving shaft. Obviously, of course, the speed ratio between the driving shaft and rotary eccentric shaft must be varied accordingly. Increasing the number of intermittent advances of the driven shaft and film for each revolution of the driving shaft reduces the driving shaft speed necessary to attain a given frame rate so that appreciabley higher frame rates may be achieved with normal speed drive motors.

In existing claw-type intermittent mechanisms, as previously noted, at least one revolution of the driving shaft is necessary to each advance of the film. This, of course, means that the driving shaft speed, for a given frame rate, will be appreciably higher than with the present mechanism. In existing mechanisms, for example, a frame rate of 24 frames per second requires a driving shaft speed of 1440 r.p.m. With the illustrative form of this invention, wherein the film is advanced four frames during each revolution of the driving shaft, however, a frame rate of 24 frames per second may be obtained with a driving shaft speed of 360 r.p.m.

Moreover, in projectors, for example, the speed of the driving shaft may be made the same as the speeds of the take-up and hold-back sprockets with the result that the reduction gearing necessary in existing projectors between these sprockets may be omitted.

In the television transmission of motion pictures, the projection and television scanning systems are presently locked-in, or synchronized, to avoid the so-called "shutter bar" effect. As is well known, this is due, in unsynchronized systems, to the differential frame speeds of the projection and scanning systems. That is, motion pictures are projected at 24 frames per second while television scanning systems have a frame rate of 30 frames per second. This differential frame rate results in the blacked out periods of the projection system, namely, those periods during which the shutter intercepts projection beam and intermittent advancing of the film takes place, occurring at progressively different positions in the field scan of the television system. The dark, or shutter, bar produced on the television viewing screen as a result of scanning of the projection screen during these blacked out periods, periodically progresses across the television viewing screen. Accordingly, relatively elaborate means are employed for maintaining the two systems synchronized.

The present intermittent mechanism is uniquely adapted to television transmission of motion pictures without the necessity of synchronization of the projection and scanning systems. That is, owing to the ability of the present mechanism to be designed for a 11¼ degree pull down, and thereby permit the film to be projected without the aid of a shutter, no "shutter bar" effect results even though the projection and scanning systems are unsynchronized. As in the case of direct viewing of the projected film, pull-down of the film occurs so rapidly as to be undetectable to the television viewer. The ability to pulse the mechanism, just described, is advantageous in optical printers, for example, to achieve certain special effects. Thus, the developed film being printed may be stopped when desired to achieve so-called "hold effects" or to slow down the action being printed.

It will be apparent that while in the mechanism described above, the teeth 98 on slide 92 engage the ring gear 100 and serve to impart intermittent movement to the film through the ring gear, the slide teeth 98 might be replaced by a "claw" of the type employed in conventional intermittent mechanisms for direct engagement with the film. In the case of such direct engagement with the film, the mechanism possesses the several advantages previously noted, namely, that engagement and disengagement of the claw with the film occurs by radial, linear movement of the claw. Sawing of the film by the claw is thus avoided.

Also a plurality, four in the case of the illustrative cam arrangement, of intermittent advances are imparted to the film during each revolution of the driving shaft. The speed of the driving shaft for a given frame rate is thus reduced and reduction gearing between the driving shaft in a projector, for instance, and the take-up and hold-back sprockets may be eliminated. The ability of the present mechanism to be pulsed is also advantageous in such cases.

Direct engagement of the claw with the film, of course, necessitates increasing the throw of the rotary eccentrics to oscillate the claw through a distance equal to the height of a frame on the film being fed.

Figures 13, 13A, 13B, 14, 15, 15A, 16:
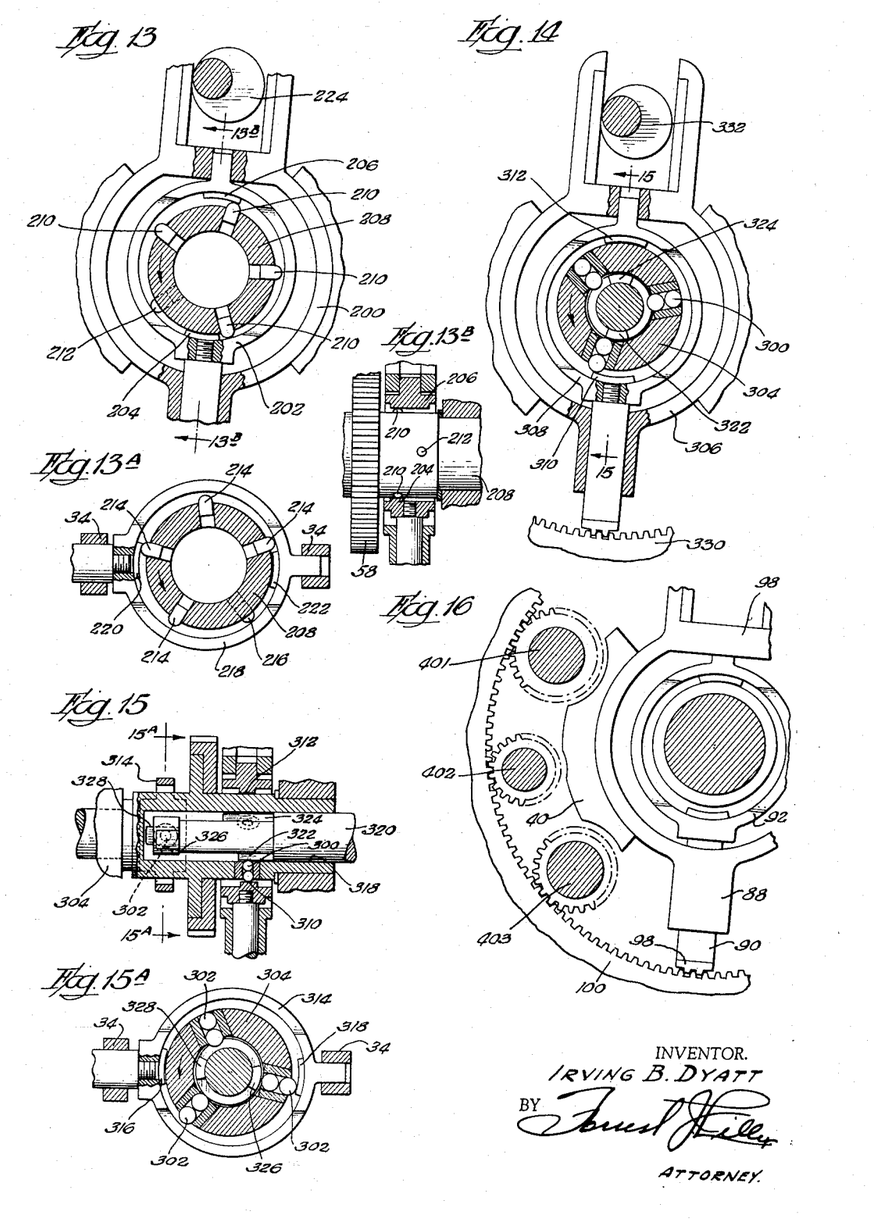
Figure 13 is a partial view, partly sectioned, of the present mechanism modified to accomplish the previously mentioned "skip-frame" technique synchronization.
Figure 13A is a section taken through the ring gear registry assembly of the modified mechanism of Figure 13, with the driving shaft occupying the same angular position as in Figure 13.
Figure 13B is a section taken along line 13B—13B of Figure 13, the driving shaft having been rotated in Figure 13B from its position in Figure 13 to bring a single cam insert in the mechanism of Figure 13 into view.
Figure 14 is a further modified form of the invention.
Figure 15 is a section taken along line 15—15 of Figure 14.
Figure 15A is a section taken along line 15A—15A of Figure 15.
Figure 16 is a still further modified form of the invention.

The modified form of the present mechanism, illustrated in Figure 13, is especially designed for use in motion picture projectors of television transmission systems. This modified mechanism, as described more fully below, operates to intermittently advance the film being televised at a 24-frame-per-second rate and in such a manner that every fourth frame of the film is scanned twice in succession by the television scanning system. Periodic resynchronization of the projection and scanning systems is thereby achieved. This modified form of the present mechanism may also be employed in background projectors for television systems as well as in optical printers to accomplish printing of motion picture film exposed at one frame rate, say 16 frames per second, on film to be projected at a different frame rate, say 24 frames per second.

The modified mechanism of Figure 13 comprises an oscillatory frame 200 identical to frame 80, previously described, and a reciprocatory slide 202 substantially identical to slide 92, previously described. Slide 202 differs from slide 92 only in the shorter lengths of the cam surfaces 204 and 206 on the slide 202 as compared to the cam surfaces on the slide 92.

Carried on driving shaft 208 of the modified mechanism are a set of four fixed camming inserts 210 located on the planes of both cam surfaces 204 and 206. The four inserts 210 are disposed in four of five positions equiangularly spaced about the driving shaft. The fifth position is uninterrupted, as shown.

A single, fixed camming insert 212 is also carried on the shaft 208 in a plane spaced axially of the shaft from the plane of the inserts 210 and cam surface 204. Cam surface 206 is axially extended so as to also lie in the plane of insert 212.

This latter insert 212 is angularly aligned with the abovementioned, uninterrupted fifth position in the plane of the inserts 210.

This modified form of the mechanism also comprises a ring gear registry or locking assembly, Figure 13A, spaced axially of the driving shaft 208 from the ring gear advancing assembly of Figure 13 in a manner similar to the ring gear advancing and registry assemblies of Figures 1–12. The registry assembly of Figure 13A comprises four fixed camming inserts 214 in one plane spaced in the same manner as the inserts 210 of Figure 13 and a single, fixed camming insert 216 in a plane spaced from the plane of the inserts 214. This latter single insert 216 is aligned with the fifth uninterrupted position in plane of the four inserts 214, as shown.

The registry assembly of Figure 13A further comprises a reciprocable locking slide 218 similar to slide 134 in Figures 1–12, differing from the latter slide only in the shorter lengths of the cam surfaces 220 and 222 on the slide 218 as compared to those on the slide 134.

Cam surface 220 on slide 218 is axially extended so as to lie in the plane of the single camming insert 216 while the cam surface 220 lies only in the plane of the four camming inserts 214.

The remainder of this modified form of the mechanism is identical to that previously described with reference to Figures 1–12 except, of course, that the actuator 118 in the latter figures has been omitted from the mechanism of Figures 13 and 13A since all of the camming inserts are fixed. It will, of course, be obvious that the mechanism of Figures 13 and 13A may, if desired, also be designed for pulsed operation in a manner similar to that described with reference to Figures 1–12.

Also, it will be apparent that since the camming inserts in Figures 13 and 13A are located in five equally spaced positions, the speed reduction between the rotary eccentrics 224, for locking frame 200, and the driving shaft 208 must be 5:1 or an even multiple thereof.

The arrangement of the modified mechanism of Figures 13 and 13A is such that frame 200 and slide 202 are oscillated and slide 202 is reciprocated to alternately engage and disengage teeth (not shown) thereon with and from a ring gear (not shown) during rotation of the driving or input shaft 208. The camming inserts 214 and 216 of the registry assembly, Figure 13A, are so orientated as to reciprocate slide 218 into and out of locking engagement with a pinion, not shown, meshing with the ring gear, in alternate sequence with extension and retraction of slide 200, as in the mechanism of Figures 1–12.

Intermittent rotation is thereby imparted to the ring gear (not shown) for intermittently advancing the film in a motion picture projector, for example, in a manner similar to that previously described with reference to Figures 1–12.

In the case of the mechanism of Figures 13 and 13A, however, once during each revolution of shaft 208, slide 202 will be retained in retracted position and registry slide 218 will be retained in extended position, to lock the ring gear (not shown) against rotation for twice the normal dwell period occurring during normal intermittent advancing of the ring gear. This, of course, results from the omission of the camming inserts in the fifth equally spaced positions of the four inserts 210, Figure 13, and the four inserts 214, Figure 13A.

Thus, a motion picture film will be intermittently fed in such a manner that every fourth frame of the film will be retained stationary for twice the dwell period occurring during the intermittent advancing of the three previous frames.

When the mechanism is employed in a projector of television transmission of motion pictures, the driving shaft 208 will be rotated at a speed to feed the film at a frame rate of 24 frames per second. In the illustrated, modified form of the invention, this corresponds to a driving shaft speed of 360 r.p.m. Every fourth frame of the film is, however, scanned twice by the television scanning system. In effect, therefore, during each six revolutions of the driving shaft, which occur during one second of time, 30 frames of the film are scanned. Thus, while the action on the projected film occurs at a 24-frame-per-second rate, the film is, in effect, being projected and scanned at a rate of 30 frames per second. The projection and scanning systems are therefore retained in synchronism.

A further modified form of the invention is illustrated in Figures 14 and 15 wherein the axially displaced sets of movable balls and fixed camming inserts comprising the ring gear advancing and registry assemblies of Figures 1–12, have been replaced by two single sets of coplanar movable ball assemblies 300 and 302, respectively. The ball assemblies in each set are of an odd number, illustratively shown as three, and are equiangularly spaced about the driving shaft 304.

The mechanism of Figures 14 and 15 further comprises an oscillatory frame 306 in which is supported a ring gear engaging slide 308. Slide 308 has a pair of cam surfaces 310 and 312 in the plane of the ball assemblies 300. The ring gear registry assembly of this modified mechanism comprises a slide 314, Figure 15A, having cam surfaces 316 and 318. Slides 308 and 314, and oscillatory frame 306 are thus similar to those of Figures 1–12.

Driving shaft 304 has a coaxial bore 318 opening through one end thereof as in the drive shaft of Figures 1–12 for receiving an actuator 320.

Actuator 318 comprises a first pair of diametrically opposed camming projections 322 and 324 engageable with the ball assemblies 300 and a second pair of camming projections 326 and 328 engageable with the ball assemblies 302. As shown, the camming projections 322 and 324 are located opposite the camming surfaces 310 and 312, respectively. When the actuator 320 is in the extended, operative position of Figure 15, these camming projections serve to cam the balls in the ball assemblies 300 radially outwardly, upon rotation of the assemblies to the zones of the respective camming surfaces 322 and 324, for engagement of the balls with the surfaces. As shown in Figure 15A, the camming projections 326 and 328 are similarly arranged relative to the camming surfaces 316 and 318. Thus, when the actuator 320 is extended, the balls in the ball assemblies 302 are cammed outwardly, to engage the cam surfaces 316 and 318, as the assemblies are rotated up to the zones of the latter cam surfaces.

The mechanism is otherwise identical to that of Figures 1–12 as is its operation. Thus, during rotation of the driving shaft 304, with actuator 320 extended, the outer balls in the ball assemblies 300 and 302 are sequentially rotated into engagement with their respective camming surfaces 310, 312 and 316, 318 to reciprocate slide 308 into and out of engagement with the ring gear 330 and reciprocate slide 314 into and out of engagement with a pinion (not shown) meshing with the ring gear, as in the mechanism of Figures 1–12. The ball assemblies 300 and 302 are so relatively orientated that the slides are extended and retracted in opposite sequence, as in the mechanism of Figures 1–12.

Oscillatory frame 306 is simultaneously rocked by rotation of eccentrics 332 from the driving shaft 304 so as to impart intermittent rotation to the ring gear 330 and driven shaft (not shown) in a manner similar to that previously described.

An odd number of ball assemblies is necessarily employed in each set 300 and 302 so that both cam surfaces, associated with each set, will not be simultaneously engaged by their respective ball assemblies. This, obviously, would cause jamming of the mechanism. Also the gear reduction ratio between the driving shaft 304 and the eccentrics 332 is made 3:1 or an even multiple thereof for the reasons previously explained.

It will be noted that camming projections 324 and 328 are of somewhat greater axial extent than the other two camming projections 322 and 326. The lengths of the projections are made such that with the actuator 320 retracted, the latter camming projections 322 and 326 are positioned out of the path of their respective ball assemblies while camming projections 324 and 328 are still positioned in the path of their respective ball assemblies.

Thus, with the actuator 320 retracted, the balls in the assemblies 300 are cammed outwardly by the projection 324, to cause retraction of slide 308. In the zone of cam surface 310, however, these balls are not restrained against radial inward movement. Accordingly, the balls in the assemblies 300 are merely cammed radially inwardly by the cam surface 310 and slide 308 remains retracted.

Similarly, the balls in the assemblies 302 are cammed outwardly by the camming projection 328 to engage the cam surface 316 on registry slide 314. In the zone of the cam surface 318, however, the balls are released for radial inward movement. It will be seen, therefore, that registry slide 314 remains extended.

With the actuator retracted, therefore, intermittent rotation of the ring gear 330 is terminated and the latter is locked against rotation by the registry slide. Intermittent rotation may again be imparted to the ring gear by operation of the actuator to its extended position of Figure 15.

As preliminarily indicated, the present mechanism is adaptable to numerous applications other than intermittent feeding of motion picture film. Thus, as illustrated in Figure 16, several pinions 400, 401 and 402 of a different number of teeth, as shown, or of the same number of teeth may be driven from the ring gear and serve to operate a series of potentiometers, for example, for periodically feeding into a computer predetermined voltage, current or resistance increments. This may be for the purpose of initially programming the computer or accomplishing actual computing operations.

In the alternative, the present mechanism may be employed to establish predetermined equal increments of time or other quantities in computers for integrating operations, for instance.

A unique application of the invention in the field of instrumentation is that of high speed switching for sampling or read out of a plurality of electrical circuits. In such cases, one or more driven shafts of the mechanism are connected to rotary electrical switches arranged to sequentially connect these circuits to one or more electrical indicating or recording instruments in rapid succession with each circuit being sampled for a brief but finite interval. Thus, analogue information in two circuits may be periodically converted to digital information at the recording instruments.

It will be apparent in the light of the foregoing description that the present invention is susceptible of numerous modifications of design and arrangement of parts. The invention is not intended to be limited by the foregoing illustrative embodiments and applications, therefore, but only by the spirit and scope of the following claims.

I claim:

1. A rotary intermittent movement of the character described, comprising a support, a driving shaft journalled in the support, an internal ring gear journalled on the support concentric with the driving shaft, a driven shaft journalled on the support and having a pinion meshed with said ring gear, an oscillatory frame mounted on the support for rocking about the axis of said driving shaft, a slide supported on said frame for oscillation with the latter and reciprocation along a radial axis intersecting the axis of said driving shaft, said frame including spaced parallel portions defining a radial slot therebetween, a rotary eccentric journalled in the support and located in said slot for oscillation of the frame by rotation of said eccentric, gear means drivably connecting said driving shaft and eccentric for rotation of the latter by the driving shaft, said slide including at least one tooth adapted to be moved into meshing engagement with the ring gear by movement of the slide in one direction along its axis of reciprocation and to be disengaged from the ring gear by movement of the slide in the opposite direction along its axis of reciprocation, the slide having an enlarged opening through which said driving shaft extends, a pair of inwardly projecting, cylindric cam surfaces on the inner wall of said opening located on the axis of reciprocation of the slide at diametrically opposed sides of said driving shaft, and camming projections on said driving shaft engageable with said cam surfaces during rotation of the latter shaft for reciprocating said slide at the limits of the arc of oscillation of the frame to sequentially engage said tooth with the ring gear at one of said limits and disengage said tooth from the ring gear at the other of said limits whereby to impart intermittent rotation to the ring gear and driven shaft.

2. The subject matter of claim 1 including a second pinion rigid on said driven shaft, a second slide slidably mounted on said support for radial reciprocation along an axis intersecting the axis of the driving shaft, and having an enlarged opening through which the driving shaft extends, at least one tooth on said second slide engageable with said second pinion by movement of the second slide in one direction along its axis of reciprocation and disengageable from said second pinion by movement of said second slide in the opposite direction along its axis of reciprocation, a pair of inwardly projecting, cylindric cam surfaces on the inner wall of the opening in the second slide and located on the axis of reciprocation of the latter at diametrically opposed sides of the driving shaft, and additional camming projections on said driving shaft engageable with the cam surfaces on the second slide reciprocating the latter, the latter projections being located to cause engagement and disengagement of the tooth on the second slide with said second pinion substantially simultaneously with and in opposite sequence to engagement and disengagement of the tooth on the first mentioned slide with the ring gear.

3. The subject matter of claim 2 wherein each of said slides has a pair of said cam surfaces, one cam surface on each slide being located proximate to the tooth on the slide and being engageable by given camming projections on the driving shaft to cause movement of the respective slides in a direction to engage the teeth on the slides with the ring gear and pinion respectively, said given camming projections being mounted on the driving shaft for radial inward movement to clear said one cam surface on the respective slides, and selectively operable actuator means for releaseably retaining said given camming projections in radial outward position for engagement with both of their respective cam surfaces.

4. In a rotary intermittent movement, the combination of: a support, a rotary shaft journalled on said support; an oscillatory frame journalled on said support for rocking about the axis of said shaft; rotary eccentric means journalled on said support and engaging said frame for rocking said frame through a given arc, means drivably coupling said shaft and eccentric means for rotation of the latter in synchronism with rotation of said shaft; a slide supported on said frame for rocking with the latter and extension and retraction of the frame in a radial direction of said shaft; and cooperating means on said shaft and slide operable in response to rotation of the shaft to extend said slide when said frame is at one end of said arc and retract said slide upon movement of said frame to the other end of said arc.

5. The subject matter of claim 4 wherein said rotary eccentric means comprises a rotary eccentric rotatable in a radial slot in said frame, said slot having a width slightly greater than the diameter of said eccentric for providing a predetermined dwell of said frame at opposite ends of said arc.

6. In a rotary intermittent movement, the combination of: a support; an oscillatory frame journalled on said support for rocking about a given axis; a slide supported on said frame for rocking with the latter, and extension and retraction on the frame in a radial direction of said axis; first rotary means for rocking said frame through a given arc, rocking of the frame from one end of said arc to the other constituting one oscillation of the frame; and second rotary means rotatable in synchronism with said first rotary means for extending said slide when said frame is at one end of said arc and retracting said slide when said frame is at the other end of said arc in such manner that said frame undergoes a single oscillation between each extension and subsequent retraction of the slide and a predetermined odd number of oscillations, greater than one between each retraction and subsequent extension of the slide.

7. In a rotary intermittent movement, the combination of: a support; an oscillatory frame journalled on said support for rocking about a given axis; a slide supported on said frame for rocking with the latter and extension and retraction on the frame in a radial direction of said axis; first rotary means for rocking said frame through a given arc, rocking of the frame from one end of said arc to the other constituting one oscillation of the frame; second rotary means; means for effecting synchronized rotation of said first and second rotary means; and cooperating means on said slide and second rotary means for alternately extending and retracting said slide a plurality of times during each revolution of said second rotary means in such manner that said slide is extended when said frame is at one end of said arc and retracted when said frame is at the other end of said arc, and said frame undergoes a single oscillation between each extension and subsequent retraction of the slide and a predetermined odd number of oscillations between each retraction and successive extension of said slide.

8. The subject matter of claim 7 wherein said predetermined odd number is greater than one.

9. In a rotary intermittent movement, the combination of: a support, an oscillatory frame journalled on said support for rocking about a given axis; a slide supported on said frame for rocking with the latter and extension and retraction on the frame in a radial direction of said axis; first rotary means for rocking said frame through a given arc, rocking of the frame from one end of said arc to the other constituting one oscillation of the frame; second rotary means; means for effecting synchronized rotation of said first and second rotary means; and cooperating means on said slide and second rotary means for alternately extending and retracting said slide a plurality of times during each revolution of said second rotary means in such manner that said slide is extended when said frame is at one end of said arc and retracted when said frame is at the other end of said arc, and said frame undergoes a single oscillation between each extension and subsequent retraction of the slide and a predetermined odd number of oscillations between each retraction and successive extension of said slide; said cooperating means including means effective during each revolution of said second rotary means to retain said slide in retracted position, following a given retraction thereof, for an odd number of oscillations of said frame greater than said predetermined odd number.

10. The subject matter of claim 9 wherein said second rotary means comprises a shaft; said cooperating means comprising a pair of cam projections on said slide at opposite sides of said shaft and on the axis of extension and retraction of the slide, and a plurality of projecting cam elements located in equiangularly spaced positions about the shaft and engageable in alternate fashion with said cam projections to extend and retract the slide, one of said positions adapted to contain an element for effecting extension of the slide being left blank.

11. In a rotary intermittent movement, the combination of: a support; an oscillatory frame journalled on said support for rocking about a given axis; first rotary means for rocking said frame through a given arc; a slide supported on said frame for rocking with the latter and extension and retraction on the frame in a radial direction of said axis; and slide operating means for effecting extension and retraction of said slide on said frame in predetermined synchronism with rocking of said frame so that the slide is extended when said frame is at one end of said arc and retracted upon movement of the frame to the other end of said arc, said slide operating means including selectively operable means for selectively rendering said slide operating means operative to extend and retract the slide and deactivating said slide operating means to retain the slide retracted while said frame continues to oscillate.

12. In a rotary intermittent movement, the combination of: a support; an oscillatory frame journalled on said support for rocking about a given axis; first rotary means for rocking said frame through a given arc; a slide supported on said frame for rocking with the latter and extension and retraction on the frame in a radial direction of said axis; second rotary means rotatable in synchronism with said first rotary means for extending said slide on said frame when the latter is at one end of said arc and retracting said slide on the frame upon movement of the latter to the other end of said arc; and selectively operable control means for selectively rendering said second rotary means operative to extend and retract said slide and deactivating said second rotary means to retain said slide in retracted position while said frame continues to oscillate.

13. The subject matter of claim 12 wherein said second rotary means comprises a rotary shaft, cooperating engageable means on said shaft and slide for extending and retracting the latter in response to rotation of said shaft; and said control means comprises means for controlling said cooperating means while said shaft continues to turn to selectively render said cooperating means effective to extend and retract the slide or to retract the slide only whereby the latter is retained in retracted position.

14. The subject matter of claim 12 wherein said second rotary means comprises a rotary shaft; said cooperating means comprising cam projections on said slide at opposite sides of said shaft and on the axis of extension and retraction of the slide, and cam elements on said shaft engageable with one of said projections to extend the slide and with the other projection to retract the slide as the shaft turns, at least some of said elements being radially movable between extended positions in the path of said projections so as to extend and retract the slide and retracted positions out of the path of said one projection only whereby said slide is only retracted and thereby retained in retracted position, and said control means comprises a selectively movable element for controlling the positioning of said radially movable elements.

15. In a rotary intermittent movement, the combination of: a support; an internal ring gear journalled on said support; an oscillatory frame journalled on said support for rocking about the axis of said ring gear; a slide supported on said frame for oscillation with the latter and extension and retraction on the slide in a radial direction of said axis; at least one gear tooth on said slide for meshing with the teeth of said ring gear when the slide is in extended position, said gear tooth clearing said teeth of the ring gear when the slide is retracted; means for oscillating said frame and slide through a given arc; means for extending and retracting said slide on the frame in synchronism with rocking of the latter so that the slide is extended at one end of said arc and retracted upon movement of the frame to the other end of the arc whereby to impart intermittent unidirectional rotation to said ring gear; and a driven pinion meshing with said ring gear having a shaft for connection to a driven element.

16. The subject matter of claim 15 including at least one additional pinion meshing with said ring gear, said pinions having a different number of teeth so as to be intermittently rotated at different speeds.

17. The subject matter of claim 15 and registry means including a second pinion connected to said first-mentioned pinion for rotation with the latter; a second slide, having at least one gear tooth, mounted on said support for extension to mesh the latter tooth with said second pinion and retraction to disengage the latter tooth and pinion; and means for extending and retracting said second slide in synchronized opposition to extension and retraction of said first-mentioned slide.

18. In a rotary intermittent movement, the combination of: a support; a rotary shaft journalled on said support; an oscillatory frame journalled on said support for rocking about the axis of said shaft; means on said support drivably coupled to said shaft and engaging said frame for rocking the latter through a given arc in synchronism with rotation of said shaft; a slide supported on said frame for rocking with the latter and extension and retraction on the frame in a radial direction of said shaft, said slide extending to opposite sides of said shaft and having an enlarged opening receiving the shaft; and cooperating cam means on said shaft and on said slide at opposite sides of the shaft along the axis of extension and retraction of the slide for extending and retracting the slide on the frame as the shaft turns.

19. The subject matter of claim 18 wherein said co-operating means comprise a pair of radially extending cam projections on said slide at diametrically opposite sides of said shaft and disposed on the axis of extension and retraction of said slide, said projections being located in axially spaced planes normal to the axis of said shaft; and radially projecting cam elements on said shaft in said planes thereof engageable with said projections, respectively, to alternately extend and retract said slide, said elements being spaced around said shaft to engage their respective cam projections in alternate fashion as the shaft turns.

20. The subject matter of claim 19 wherein the number of cam elements in each of said planes is greater than one, and the number of elements in the two planes are equal.

21. The subject matter of claim 18 wherein said cooperating means comprise a pair of radially extending cam projections on said slide at opposite sides of said shaft and disposed on the axis of extension and retraction of said slide, said projections being located in a common plane normal to the axis of said shaft, and an odd number of radially projecting cam elements on said shaft in said plane thereof alternately engageable with said projections as the shaft turns to extend and retract said slide.

22. In a rotary intermittent movement, the combination of: a support; an oscillatory frame journalled on said support for oscillation about a given axis; means for oscillating said frame through a given arc; a first slide supported on said frame for oscillation with the latter and extension and retraction of the frame in a radial direction of said axis; a second slide mounted on said support for extension and retraction in a given direction; claw means on each of said slides; drivably connected rotary means engageable by said claw means respectively when said slides are in extended position; and operating means for extending and retracting said slides in synchronism with oscillation of the frame and in synchronized opposition to one another so that said first slide is extended when said frame is at one end of said arc and retracted upon movement of said frame to the other end of said arc and said first and second slides are extended and retracted in opposed fashion, said operating means including selectively operable control means for selectively rendering said operating means effective to extend and retract said slides and to only retract said first slide and only extend said second slide while said frame continues to oscillate whereby to effect retention of said first slide in retracted position and retention of said second slide in extended position.

23. In a rotary intermittent movement, the combination of: a support; an oscillatory frame journalled on said support for oscillation about a given axis; means for oscillating said frame through a given arc; a first side supported on said frame for oscillation with the latter and extension and retraction of the frame in a radial direction of said axis; a second slide mounted on said support for extension and retraction in a given direction; claw means on each of said slides; drivably connected rotary means engageable by said claw means respectively when said slides are in extended position; and operating means for extending and retracting said slides in synchronism with oscillation of the frame and in synchronized opposition to one another so that said first slide is extended when said frame is at one end of said arc and retracted upon movement of said frame to the other end of said arc and said first and second slides are extended and retracted in opposed fashion, said operating means including a rotary shaft on said support, first cooperating means on said shaft and first slide for extending and retracting the latter as said shaft turns, and second cooperating means on said shaft and second slide for extending and retracting the latter as the shaft turns.

References Cited in the file of this patent

UNITED STATES PATENTS

| | | |
|---|---|---|
| 2,006,297 | Eisemann | Jan. 25, 1935 |
| 2,482,645 | Berck | Sept. 20, 1949 |
| 2,649,836 | Clapp | Aug. 26, 1953 |
| 2,784,599 | Moulin | Mar. 12, 1957 |
| 2,787,189 | Eissfeldt | Apr. 2, 1957 |